(12) United States Patent
Bergman

(10) Patent No.: US 9,347,011 B2
(45) Date of Patent: May 24, 2016

(54) METHOD AND DEVICE FOR TREATING BIOMASS

(75) Inventor: Peter Christiaan Albert Bergman, Callantsoog (NL)

(73) Assignee: TOPELL ENERGY B.V., The Hague (NL)

(*) Notice: Subject to any disclaimer, the term of this patent is extended or adjusted under 35 U.S.C. 154(b) by 461 days.

(21) Appl. No.: 13/980,277

(22) PCT Filed: Jan. 27, 2012

(86) PCT No.: PCT/NL2012/050047
§ 371 (c)(1),
(2), (4) Date: Jul. 17, 2013

(87) PCT Pub. No.: WO2012/102617
PCT Pub. Date: Aug. 2, 2012

(65) Prior Publication Data
US 2013/0298457 A1    Nov. 14, 2013

(30) Foreign Application Priority Data
Jan. 27, 2011   (NL) .................................. 2006079

(51) Int. Cl.
*C07C 1/00* (2006.01)
*C10L 9/08* (2006.01)
*C10B 49/02* (2006.01)
(Continued)

(52) U.S. Cl.
CPC .................. *C10L 9/083* (2013.01); *C10B 49/02* (2013.01); *C10B 53/02* (2013.01); *C10B 57/02* (2013.01); *C10L 5/40* (2013.01); *C10L 5/44* (2013.01); *Y02E 50/10* (2013.01); *Y02E 50/14* (2013.01); *Y02E 50/15* (2013.01); *Y02E 50/30* (2013.01)

(58) Field of Classification Search
CPC ........ C10B 57/14; C10B 57/10; C10B 55/10; C10B 53/00; C10L 9/083
USPC .............. 201/7, 21, 31; 202/96; 585/240, 242
See application file for complete search history.

(56) References Cited

U.S. PATENT DOCUMENTS 4,816,572 A     3/1989  Bourgeois
9,102,878 B2*  8/2015  Powell ...................... C10G 1/00
(Continued)

FOREIGN PATENT DOCUMENTS

CN     101367086 A    2/2009
EP        2186578     5/2010
(Continued)

OTHER PUBLICATIONS

Communication (Form 2906), European Patent Office, Application No. 12704932.8-1361, dated Sep. 26, 2014.
(Continued)

*Primary Examiner* — Nina Bhat
(74) *Attorney, Agent, or Firm* — George C. Rondeau, Jr.; Davis Wright Tremaine LLP

(57) ABSTRACT

A treatment of biomass comprises supplying biomass which contains an amount of moisture to a first treatment device of a torrefaction system where the biomass is heated to a torrefaction temperature and substantially completely dried by evaporating the moisture to form a torrefied biomass. The at least partially torrefied biomass is removed from the first treatment device after a first time period and transferred to a second treatment device where it is kept for a longer second time period.

22 Claims, 4 Drawing Sheets

(51) Int. Cl.
*C10B 53/02* (2006.01)
*C10B 57/02* (2006.01)
*C10L 5/40* (2006.01)
*C10L 5/44* (2006.01)

(56) References Cited

U.S. PATENT DOCUMENTS

| | | | |
|---|---|---|---|
| 2009/0007484 A1* | 1/2009 | Smith | C10B 47/44 |
| | | | 44/606 |
| 2009/0250331 A1* | 10/2009 | Hopkins | C10B 47/44 |
| | | | 201/6 |
| 2010/0101141 A1 | 4/2010 | Shulenberger | |
| 2010/0162619 A1 | 7/2010 | Peus | |
| 2011/0154684 A1* | 6/2011 | Lundgen | C10L 5/44 |
| | | | 34/427 |
| 2011/0179700 A1* | 7/2011 | Monroe | C10B 53/02 |
| | | | 44/589 |
| 2014/0202073 A1* | 7/2014 | Leonhardt | C10B 49/02 |
| | | | 44/606 |

FOREIGN PATENT DOCUMENTS

| | | |
|---|---|---|
| FR | 2924435 | 6/2009 |
| WO | 2010089342 | 8/2010 |
| WO | 2011119470 A1 | 9/2011 |

OTHER PUBLICATIONS

Communication from The State Intellectual Property Office of P.R. China, Application No. 2012800067513 dated May 21, 2014.

\* cited by examiner

METHOD AND DEVICE FOR TREATING BIOMASS

This application claims the benefit of International Application No. PCT/NL2012/050047 filed Jan. 27, 2012 which claims priority to NL2006079 filed Jan. 27, 2011, the contents of which are incorporated herein in their intireties.

The invention relates to a method for treating biomass using a torrefaction system. In this case, biomass which contains an amount of moisture is supplied to a torrefaction system. The biomass containing moisture is heated to a torrefaction temperature of at least 180° C. in the torrefaction system, in which the biomass containing moisture is dried substantially completely by evaporating the moisture and the dried biomass torrefies at least partially to form torrefied biomass.

In the present patent application, the term biomass is understood to mean any organic material. Biomass is present in biodegradable industrial and domestic waste, such as green waste and waste paper. In addition, biodegradable products, waste matter and residues from agriculture and other industries contain biomass, for example mowed grass and prunings.

It is possible to generate sustainable energy by cofiring biomass in power stations. However, the energy infrastructure of coal-fired power plants is based on coal as fuel. Biomass cannot be cofired in coal-fired power plants without pretreatment, because the properties of biomass differ significantly from coal. For example, the pulverizability, pulverization and net heating value of biomass are insufficient to cofire the biomass in a coal-fired power plant without pretreatment. In addition, the energy density of biomass is significantly lower than the energy density of coal, making the logistics and storage of biomass relatively expensive. In addition, the wide range of types of biomass prevents a large-scale standardization of biomass fuel, which hampers the creation of a global market of biomass fuels.

In order to be able to make biomass more suitable as a fuel for cofiring in coal-fired power plants, it is known to pretreat the biomass, for example by torrefaction. Torrefaction is a thermal pretreatment method for biomass which can be applied to all kinds of biomass. During the torrefaction process, the biomass is heated, usually under atmospheric pressure, to a torrefaction temperature of 180-350° C. in a low-oxygen to oxygen-free gaseous environment. The substoichiometric amount of oxygen prevents the biomass from combusting. Instead, the biomass is "roasted", resulting in loss of mass due to degassing. The loss of mass is usually smaller than the loss of energy, resulting in energy densification. After the biomass has been torrefied, the energy per unit mass has increased. The torrefied biomass forms a biomass fuel with a higher calorific value. For example, the loss of mass is approximately 30%, while the energy value is reduced by only 10%.

Torrefaction leads to chemical modifications of the biomass structure. The biomass loses its mechanical strength and resilience, as a result of which the pulverizability improves significantly. By pulverizing and subsequently compressing the torrefied biomass, the energy per unit volume increases, so that the energy density can become similar to that of coal. In addition, torrefied biomass is hydrophobic, as a result of which it is better able to withstand the effects of water or atmospheric humidity. The risk of rotting and overheating during storage of the biomass fuel produced by torrefaction is minimal.

Generally, biomass contains unbound and bound water. Non-dried biomass almost always has a moisture content of at least 8% based on mass. However, the moisture content of natural biomass may, for example, also be more than 50% based on mass. Prior to the torrefaction process, the biomass therefore contains a significant amount of moisture. The removal of moisture from the biomass prior to reaching the torrefaction temperature of at least 180° C. is an important step, both from a technical and economic point of view. For biomass having a relatively high moisture content, for example more than 20%, it is known to predry the biomass first until the moisture content has decreased to 10-20%.

After optional predrying, the biomass is supplied to a torrefaction system in which the biomass is heated by known methods to the torrefaction temperature of at least 180° C. Before torrefaction of a biomass particle does indeed occur, said biomass particle containing moisture will first have to dry substantially completely by evaporation of the moisture from the biomass particle. The biomass particle therefore first passes through a heating-up range which starts, for example, between 0-150° C. and which ends in the temperature range of torrefaction. During the heating-up range, the moisture evaporates from the biomass until the biomass has been substantially completely dried—the moisture content has in that case fallen to as little as 0-5%.

The biomass is thus first heated to a drying temperature which is between approximately 50-150° C. During the evaporation of the moisture, the biomass remains at the drying temperature (drying phase). Once the moisture has evaporated from the biomass, the temperature of the biomass can be increased to the torrefaction temperature. The actual torrefaction of the biomass only starts when the temperature of the biomass exceeds approximately 180° C. (torrefaction phase). The temperature at which torrefication of the biomass starts depends, for example, on the type of biomass. The biomass is usually heated to a higher torrefaction temperature, such as at least 260° C. Once the biomass has torrefied completely, the torrefied biomass is cooled.

Heating the biomass to the torrefaction temperature takes a relatively large amount of energy, due to the fact that the moisture which is still present in the biomass at the start of the heating process has to be evaporated. Once the desired torrefaction temperature has been reached, the actual torrefaction of the biomass particles takes a relatively small amount of energy. The capacity of a torrefaction technology (mass of the biomass to be torrefied per unit time) is therefore mainly determined by the heating of the biomass and the accompanying evaporation of moisture from the biomass.

Various methods are known in order to evaporate the moisture from the biomass and to torrefy the dried biomass, such as a method in which several directly heated torrefaction reactors of the Continuous Ideally Stirred-Tank Reactor (CISTR) type are connected in series. In such a reactor, heat transfer takes place by direct contact between the biomass particles and a heating agent, such as a hot gas. In this case, the required energy for the evaporation of moisture from the biomass and the torrefication of the dried biomass is supplied by supplying the hot gas which is in direct contact with the biomass particles. Due to the high gas permeability of the biomass, a relatively large amount of hot gas can be passed through the biomass.

In the torrefaction reactor of the CISTR-type, it is possible to achieve good heat transfer by intense mixing. At the same time, spread of residence time occurs in the torrefaction reactor of the CISTR-type, as a result of which not all biomass particles have the same time/temperature history. This can give rise to differences in product quality between the torrefied biomass particles and even to non-torrefied biomass particles. In order to ensure that all biomass particles are torrefied sufficiently despite the spread of residence time in the torrefaction reactor of the CISTR-type, several such directly heated torrefaction reactors of the CISTR-type are connected in series. If a biomass particle in the first torrefaction reactor of the CISTR-type is not torrefied or not torrefied sufficiently, there is only a small risk that this biomass particle will still not have been torrefied or not have been sufficiently torrefied after passing through the subsequent torrefaction reactors of the CISTR-type.

However, the temperature control in the torrefaction system comprising several series-connected torrefaction reactors of the CISTR-type is not optimal. In addition, the required installation height of the torrefaction system is, for example, approximately 30-40 metres. In addition, a system of downpipes or other transport means is required in order to transfer the biomass particles from one torrefaction reactor to the next torrefaction reactor.

It is an object of the invention to provide an improved method for treating biomass.

According to the invention, this object is achieved by a method for treating biomass with a torrefaction system, which torrefaction system comprises a first treatment device and a second treatment device, and in which the method comprises:

supplying biomass which contains an amount of moisture to the first treatment device of the torrefaction system, heating the biomass containing moisture in the first treatment device of the torrefaction system to a torrefaction temperature between 260-310° C. within a first time period, in which the biomass containing moisture is substantially completely dried by evaporating the moisture and the dried biomass is at least partially torrefied to form torrefied biomass, removing the at least partially torrefied biomass from the first treatment device after the first time period, supplying the biomass removed from the first treatment device to the second treatment device, keeping the biomass supplied to the second treatment device in the second treatment device at a temperature between 230-280° C. for a second time period which is longer than the first time period.

The biomass is formed by solid biomass particles. The biomass containing moisture is heated in the torrefaction system, preferably using a substoichiometric amount of oxygen, in the first treatment device to the predetermined torrefaction temperature which is between 260-310° C., preferably between 270-310° C. According to the invention, the biomass is dried in the first treatment device within the first time period, preferably using a substoichiometric amount of oxygen, and heated to a temperature in the predetermined torrefaction temperature range. Thereby, the biomass particles are also at least partially torrefied, that is to say a portion of the biomass particles is torrefied and a portion of the biomass particles is not yet or not yet completely torrefied upon leaving the first treatment device.

The biomass only remains in the first treatment device during the first time period. Immediately after the first time period in the first treatment device, the at least partially torrefied biomass is transferred to the second treatment device. In this case, it is possible for the at least partially torrefied biomass to undergo an interim cooling step following the first time period in the first treatment device before being transferred to the second treatment device. This interim cooling step may take place, for example, in an intermediate cooling device.

In the second treatment device, the biomass is kept at a predetermined torrefaction temperature which is between 230-280° C. using a substoichiometric amount of oxygen for the second time period which is longer than the first time period. The substoichiometric amount of oxygen means that the torrefication of the biomass in the second treatment device is carried out in a low-oxygen to oxygen-free environment. Keeping the biomass at the desired torrefaction temperature during the second time period in the second treatment device ensures that all biomass particles are sufficiently torrefied to form a high-quality biomass fuel.

The invention provides for the torrefaction of the biomass to be completed after the torrefication of the biomass in the second treatment device. Preferably, the biomass is then cooled down substantially, for example to a temperature of approximately 80° C. or lower. In a further embodiment, it is provided that the torrefied and cooled biomass is pulverized in a pulverizing device, and is optionally compressed to form shaped biomass parts in a pressing device, for example pellets.

The invention makes it possible to separate, on the one hand, the drying and heating phase and, on the other hand, the torrefaction phase in terms of process engineering. As a result thereof, the first treatment device and the second treatment device can each be optimized for the phase which is to be performed therein. Consequently, a combination of one or more reactors of a first type as first treatment device and one or more reactors of a second type as second treatment device can be used. It is possible to ensure that such a combination matches the needs of the drying and heating phase and the torrefaction phase in the torrefaction process in an optimum manner. The reactor or reactors of the first type may primarily fulfil the energy requirement of the process, while the quality of the torrefied product can be ensured by the reactor or reactors of the second type. As a result thereof, the method according to the invention is a process which can be scaled up relatively quickly and readily and which can be controlled particularly well by means of temperature control in the second treatment device. In addition, the energy costs are relatively low.

Due to the abovementioned temperature ranges for the torrefaction temperature in the first treatment device and in the second treatment device, and the optional intermediate cooling step, the biomass fuel which is produced has particularly advantageous properties, as will be explained now.

Biomass mainly consists of the polymers cellulose, hemicellulose and lignin. During torrefaction, cellulose, hemicellulose and lignin undergo decomposition reactions, resulting in a change in the properties of the biomass. Cellulose, hemicellulose and lignin undergo different decomposition reactions. In addition, cellulose, hemicellulose and lignin have a different degree of reactivity in the torrefaction temperature regime. The decomposition mechanisms of cellulose, hemicellulose and lignin as a function of the temperature can be divided into: A) drying, B) glass transition and/or softening, C) depolymerization and recondensation, D) limited degassing and carbonization, and E) intense degassing and carbonization.

In the abovementioned decomposition mechanisms A), B) and C), relatively little loss of mass occurs—at most a desired degassing in which $CO_2$ and $H_2O$ are formed. $CO_2$ and $H_2O$ have no calorific value and therefore this degassing does result in loss of mass, but not or hardly at all in loss of energy. In the abovementioned decomposition mechanism D), the loss of mass increases and in E) the decomposition reaction proceeds relatively quickly. During the decomposition mechanisms D) and E), a relatively large amount of energy passes to the gas phase and the energy value of the biomass decreases.

The reactivity for cellulose, lignin and hemicellulose differs considerably. Hemicellulose is the most thermally unstable and undergoes degassing and carbonization between, for example, approximately 200-280° C. Cellulose is still relatively stable then and undergoes degassing and carbonization in the temperature range of, for example, approximately 250-360° C. The decomposition of both polymers is characterized by a clear peak in the decomposition rate. The decomposition of lignin starts at, for example, approximately 200° C., and then proceeds relatively slowly. When the temperature is increased, the decomposition rate increases at a moderate rate. Only at temperatures above approximately 280° C. does significant degassing take place, although the reaction rate is in this case smaller than the reaction rate which is observed for the two other polymers. Said temperatures may incidentally differ for each type of biomass and also depend, for example, on the form of the biomass.

In order to produce a biomass fuel having optimum properties, it is desirable for the decrease in mass after the torrefaction process to be as large as possible, and for the loss of energy to be as limited as possible, while also achieving the further desired properties, such as improved pulverizability. The improved properties are mainly caused by the substantial decomposition of hemicellulose and depolymerization of cellulose. This results in the biomass losing its integrity, leading to, for example, improved pulverizability and a higher net heating value of the torrefied product.

It is known to use relatively long residence times in a torrefaction process. The residence time in a known torrefaction system is the time period for the drying phase, heating phase and torrefaction phase together. The torrefaction time is the time period during which the biomass is kept at a temperature of at least 180° C., that is to say the time period of the torrefaction phase. In the prior art, the torrefaction time is usually longer than 15-30 minutes, which means that, in a known torrefaction system, the total residence time (the time period for the drying phase, heating phase and torrefaction phase together) will quickly exceed 30 minutes. The mass yield for such a residence time and a temperature of approximately 280° C. is in the order of 80% to 90% of the mass of the dry, non-torrefied biomass. The loss of mass is mainly caused by the decomposition of hemicellulose.

Surprisingly, it has been found according to the invention that the decomposition of hemicellulose can proceed much more quickly than is known in the prior art. By using high heating rates, it is possible to achieve a mass yield of 80 to 90% at a torrefaction temperature of for example 280° C. and at a torrefaction time of less than 300 seconds, preferably less than 180 seconds. Since the reactivity of hemicellulose is significantly higher than the reactivity of cellulose and lignin, the decomposition of cellulose and lignin can be largely prevented for such a short reaction time.

According to the method according to the invention, a distinction is made between the decomposition of hemicellulose and the decomposition of the two other polymers. First, the biomass in the first treatment device is heated to the torrefaction temperature which is between 260-310° C., preferably between 270-310° C. In this case, the decomposition of cellulose and lignin is largely prevented and the loss of energy remains limited. By subsequently bringing the biomass into the second treatment device at a torrefaction temperature which is between 230-280° C. and keeping it in this range, further decomposition of cellulose and lignin remains substantially limited to depolymerization and recondensation. In this case, a relatively large amount of $CO_2$ and $H_2O$ is formed, which results in a reduction in mass, while the energy in the torrefied product is preserved. In addition, there is an increased concentration of lignin which has surprisingly remained intact to such an extent that the plastic and binding properties can be used to maximum effect during compaction of the biomass. The biomass which is torrefied according to the invention in this way, results in an improved energy densification, improved pulverizability and improved hydrophobic properties.

Preferably, according to the invention, the torrefaction temperature in the first treatment device is set to a temperature between 270-310° C. or between 260-290° C. or between 270-290° C.

The torrefaction temperature in the second treatment device is preferably between 230-260° C.

According to the invention, it is possible that the first time period is at most 10 minutes, preferably at most 3 minutes. In the first treatment device, the biomass particles are dried within the first time period and heated to said predetermined torrefaction temperature. Therefore, the drying and heating phase is relatively short. As a result thereof, the decomposition of cellulose and lignin in the first treatment device is largely prevented and the loss of energy remains limited. After the biomass particles have reached said torrefaction temperature in the first treatment device, the biomass particles are heated thoroughly in the second treatment device during the relatively long second time period, optionally after interim cooling. The second time period may be at least 3 minutes, preferably at least 5 minutes, such as at least 10 minutes or at least 20 minutes.

According to the invention, it is possible for the biomass in the second treatment device to be kept at a temperature which is lower than the highest temperature which the biomass reaches in the first treatment device. This results in particularly advantageous properties for the torrefied product.

In an embodiment, the invention provides for the biomass to be cooled during the passage from the first treatment device to the second treatment device, in particular if the temperature which is realized in the second treatment device is lower than the highest temperature which the biomass has reached in the first treatment device. Said cooling can preferably be carried out in such a manner that the cooled biomass has a temperature between 230-250° C., for example 240° C. As a result thereof, it is, for example, possible to bring the biomass in direct contact with a particularly hot gas in the first treatment device during the short first time period, which promotes the quick progress of the processes in said phase. The subsequent cooling phase then results in a cooling down and thus influences the processes in the biomass, in particular the decomposition of cellulose and lignin, which is advantageous for the progress of the torrefaction process in the second treatment device and for the quality of the torrefied biomass product. The cooling step is preferably carried out by bringing the biomass particles into direct contact with a coolant gas.

The cooling down can take place near the discharge of the first treatment device, directly downstream of the supply of the second treatment device and/or at an intermediate position. In an embodiment of the first and/or second treatment device in which the biomass is brought into contact with a hot gas in a fluidized bed, a coolant gas may be supplied locally for the optional cooling, so that a part of the bed cools down the passing biomass particles. It is also possible to provide a separate cooling device with a fluidized bed between the first and second treatment device.

According to the invention, the first treatment device may be configured in various ways. According to the invention, it is for example possible to heat the biomass to the torrefaction temperature in the first treatment device by supplying a hot gas to the first treatment device which is brought into direct contact with the biomass. In this case, the hot gas can be supplied to the first treatment device in such a manner that biomass particles of the biomass in the first treatment device are fluidized. As a result, the heat transfer between the biomass and the hot gas is particularly good.

The first treatment device according to the invention may, for example, be configured according to the principle of the Continuous Ideally Stirred-Tank Reactor (CISTR). An example of a CISTR reactor is a reactor with a fluidized bed, such as a "bubbling fluidized bed" or a "torroidial fluidized bed". The first treatment device comprises, for example, a directly heated reactor of the CISTR type or two series-connected directly heated reactors of the CISTR type. The drying and heating phases proceed relatively quickly, so that the biomass reaches the torrefaction temperature of at least 180° C. relatively quickly.

In a particular embodiment, the first treatment device is provided with an annular treatment chamber which defines a substantially vertical axis, which treatment chamber comprises a supply for biomass particles, a discharge for biomass particles and a bottom, which bottom is provided with supply openings which debouch upwards into the treatment chamber, preferably obliquely with respect to the vertical axis, in which a hot gas is supplied to the supply openings for forming a fluidized bed of biomass particles on the bottom which is displaced in the peripheral direction of the annular treatment chamber. Such a torbed reactor is known, for example, from WO99/16541. When using a torbed reactor as a heating device, the heat transfer between the supplied hot gas and the biomass is particularly good.

According to the invention, the hot gas which is supplied to the first treatment device may contain at least 2% oxygen on a volume basis, preferably at least 5% oxygen on a volume basis or at least 6% on a volume basis, and this hot gas preferably contains at most 20% oxygen on a volume basis, preferably 16% oxygen on a volume basis or at most 12% on a volume basis. The oxygen percentage on a volume basis therefore lies between 2-20%, 2-16%, 2-12%, 5-20%, 5-16%, 5-12%, 6-20%, 6-16% or 6-12%. In this description, the term oxygen is understood to mean the molecule or gas $O_2$.

With known torrefaction methods, the torrefaction of biomass generally takes place in a low-oxygen to oxygen-free (inert) atmosphere. The presence of oxygen may lead to partial oxidation of the biomass, which results in a reduced product yield and a product of lower quality. In addition, the presence of oxygen leads to the risk of an increase in temperature during the torrefaction phase, so that the temperature can be controlled less well. In connection with the desired low oxygen content, it is known from the prior art to use an inert gas or a process-specific torrefaction gas in a directly heated torrefaction reactor. Waste gases, which originate, for example, from combustion processes, are usually available and inexpensive. However, with known torrefaction methods in a directly heated torrefaction reactor, waste gases cannot be used as heating agent without being treated, because the waste gases contain too much oxygen, for example 5-6% oxygen on a volume basis, for known torrefaction methods. According to the invention and in contrast to the prior art, these inexpensively available waste gases or other gases with a relatively high oxygen content can, however, be used for heating the biomass in the first treatment device.

According to the invention, the biomass in the first treatment device is heated in a relatively short time—for example in less than 300 seconds—to a torrefaction temperature which is in the range associated with the first treatment device. In the first treatment device in which the biomass particles are in direct contact with a heating agent, preferably a hot gas, it has surprisingly been found, according to the invention, that the heating agent, preferably a hot gas, can then contain a relatively high oxygen content, for example 2% oxygen on a volume basis or 5% oxygen on a volume basis or 6% on a volume basis. The presence of such an amount of oxygen in this phase appears to have no or hardly any adverse effects on the torrefaction process and the torrefied product. This is possible because the biomass undergoes significant degassing in this phase, as a result of which a stream of emerging gas is present around the biomass particles. The compounds which are produced in the initial phase of the torrefaction process are mainly $H_2O$ and $CO_2$ and low concentrations of compounds with low flammability. Due to the fact that the hot gas which is brought into direct contact with the biomass particles in the first treatment device can, according to the invention, have said relatively high oxygen percentages, it is, according to the invention, possible to use inexpensively available waste gases or other gases with a relatively high oxygen content for heating the biomass in the first treatment device.

According to the invention, the second treatment device can be configured in various ways. The second treatment device according to the invention may, for example, be configured according to the principle of a plug flow reactor. In a plug flow reactor, all biomass particles have virtually the same time/temperature history. An example of a plug flow reactor is a sliding fixed bed reactor or a screw reactor.

In an embodiment of the invention, it is possible for the biomass in the second treatment device to be kept in said temperature range during the second time period by supplying hot gas to the second treatment device which is brought into direct contact with the biomass in the second treatment device. The hot gas which is supplied to the second treatment device will preferably contain at most 3% oxygen on a volume basis, particularly preferably at most 2% oxygen on a volume basis. The hot gas which is supplied to the second treatment device is, for example, an inert gas.

After the at least partially torrefied biomass has been transferred to the second treatment device, the biomass is held at a torrefaction temperature within said range in the second treatment device during the second time period. As a result of the longer torrefaction time compared to the first phase, it is possible for carbonization reactions to take place in the second treatment device which give rise to oxidation reactions, in particular because the gaseous decomposition products which are released after initial degassing are more flammable. This phenomenon is known as auto-ignition or self-heating, and occurs if heat is retained in the biomass for a prolonged period of time. By using an inert to low-oxygen gas having an oxygen content of at most 3% on a volume basis, preferably at most 2% on a volume basis, as hot gas in the second treatment device, it is, according to the invention, possible to keep the biomass at the desired torrefaction temperature in said range by means of direct heating, while virtually preventing carbonization.

The second treatment chamber may comprise a single treatment chamber for the biomass, but may, if desired, also comprise several treatment chambers connected in series.

According to the invention, it is possible for the second treatment device to define a tubular space having a length and a diameter, the length of the tubular space being greater than or equal to the diameter of the tubular space. In this case, a turbulent flow of the hot gas which is in direct contact with the biomass particles in the second treatment device may develop across the entire cross-sectional area in the second treatment device, so that the heat transfer is advantageous.

As an alternative to direct heating, it is, according to the invention, possible for the biomass in the second treatment device to be kept in said temperature range during the second time period by a heating agent, for example a hot gas, which is separated from the biomass in the second treatment device by means of a partition wall and is in heat-exchanging contact with the biomass in the second treatment device via the partition wall. The second treatment device is in this case configured for indirectly supplying heat to the biomass in the second treatment device. As the heating agent is in this case not in contact with the biomass which is torrefied in the second treatment device, the presence of oxygen in the heating agent is not a limitation.

For example, the second treatment device is provided with a supply for supplying biomass particles of the biomass, a discharge for discharging biomass particles of the biomass, and a displacement device for moving the biomass particles from the supply to the discharge. The displacement device is, for example, a screw or other mechanical displacement device which moves the biomass particles through the second treatment device. Preferably, the biomass is constantly moved by the mechanical displacement device during the treatment in the second treatment device. As an alternative, the mechanical displacement device may be omitted, in which case the biomass is transported by means of the gas stream in the second treatment device.

In an embodiment according to the invention, the first treatment device comprises a drying device and a torrefaction device, in which the biomass containing moisture is dried substantially completely in the drying device, preferably in 3 minutes at most, and in which the dried biomass is transferred from the drying device to the torrefaction device, and in which the dried biomass is at least partially torrefied in the torrefaction device of the first treatment device, preferably in 3 minutes at most. In this case, drying and heating the biomass to the torrefaction temperature is carried out in two steps. First, the biomass is dried substantially completely in the drying device, that is to say the moisture content of the biomass in the drying device falls to 0-5%. In the drying device, the biomass reaches a temperature, for example, which is between 80-180° C., such as a temperature of at most 150° C. However, the biomass may also be heated to a higher temperature in the drying device, such as at most 180° C. or at most 200° C. The drying process lasts, for example, less than 3 minutes or even less than 1 minute. Subsequently, the biomass is heated in the torrefaction device to said torrefaction temperature which is between 260-310° C. The residence time in this torrefaction device is preferably also less than 3 minutes or even less than 1 minute.

In this case, it is possible for the drying device and the torrefaction device of the first treatment device to each be provided with an annular treatment chamber which defines a substantially vertical axis, which treatment chamber comprises a supply for biomass particles, a discharge for biomass particles and a bottom, which bottom is provided with supply openings which debouch upwards into the treatment chamber, preferably obliquely with respect to the vertical axis, in which a hot gas is supplied to the supply openings for forming a fluidized bed of biomass particles on the bottom which is displaced in the peripheral direction of the annular treatment chamber, for example by a displacement device or by the flow of gas. In this embodiment, the drying device and the torrefaction device are each, for example, configured as a torbed reactor, in which the bottom is formed by obliquely arranged blades which, between them, form the supply opening from which the hot gas passes from below to a fluidized bed of biomass particles which is situated above the blades and thus also moves the particles in the direction of the annular chamber. With a torbed reactor, the biomass particles can very quickly be dried and/or heated to the desired temperature.

An embodiment of the method according to the invention comprises supplying biomass which contains a first amount of moisture to a pre-drier, and heating the biomass containing the first amount of moisture in the pre-drier in order to evaporate moisture from said biomass until it contains a second amount of moisture which is smaller than the first amount of moisture, and in which the biomass containing the second amount of moisture is supplied to the first treatment device of the torrefaction system. The moisture content of the biomass which is supplied to the pre-drier is, for example, 20-50%. After the pre-drier, the moisture content of the biomass may have decreased to 10-20%. The second amount of moisture forms an amount of residual moisture. The biomass with such a residual moisture content is then supplied to the first treatment device of the torrefaction system according to the invention.

The invention also relates to a torrefaction system for treating biomass, comprising:
  a first treatment device, comprising a first supply for supplying biomass which contains an amount of moisture to the first treatment device, first heating means for heating the biomass containing moisture to a torrefaction temperature between 260-310° C. within a first time period for substantially completely drying the biomass containing moisture by evaporation of the moisture and at least partially torrefying the dried biomass to form torrefied biomass in the first treatment device, and a first discharge for discharging torrefied biomass from the first treatment device,
  a second treatment device, comprising a second supply which is connected to the first discharge of the first treatment device for transferring the biomass from the first treatment device to the second treatment device, in which the second treatment device is configured to keep the biomass therein at a temperature between 230-280° C. for a second time period which is longer than the first time period, and in which the second treatment device is provided with a second discharge for discharging the biomass torrefied in the second treatment device.
  According to the invention, the torrefaction system comprises a first treatment device and a second treatment device, in which the first treatment device is configured for heating the biomass therein to said torrefaction temperature range within a first time period, and the first treatment device and the second treatment device are connected to one another, optionally via an intermediate cooling device, in order to transfer the biomass from the first treatment device to the second treatment device, and in which the second treatment device is configured to keep the biomass therein at said torrefaction temperature range for a second time period which is longer than the first time period. The first and second treatment device are in this case each configured such that it is possible to heat and keep the biomass at said torrefaction temperature ranges using a substoichiometric amount of oxygen.

According to the invention, the torrefaction system may be configured according to one or more of the features described herein and/or one or more of the features according to the clauses and/or the claims.

The invention will now be explained in more detail with reference to an illustrative embodiment which is illustrated in the figures, in which.

Figure 1:
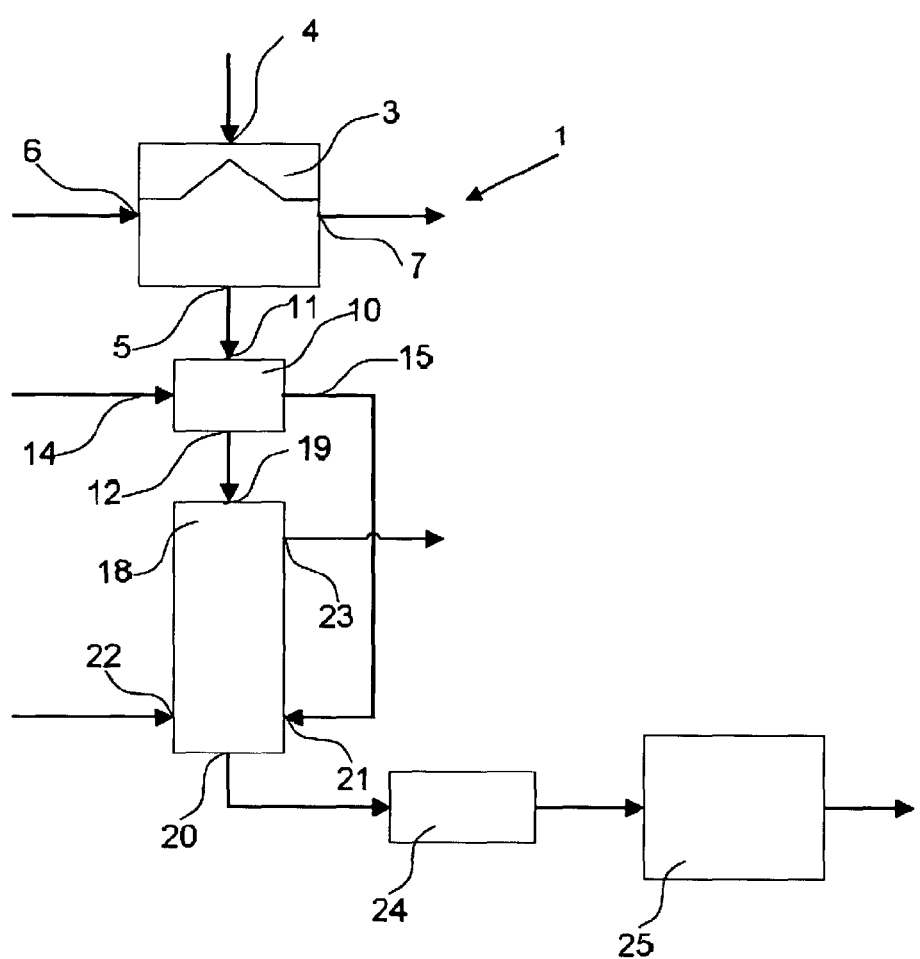
FIG. 1 shows a diagrammatic process diagram of a system and a method for treating biomass according to the invention.

The torrefaction system for treating biomass according to the invention is denoted overall by reference numeral 1. The torrefaction system 1 is used for a torrefaction process, in which biomass is heated to a torrefaction temperature in a low-oxygen to oxygen-free gaseous environment, usually under atmospheric pressure.

The torrefaction system 1 comprises a first treatment device 3 with a supply 4 for supplying biomass. The biomass supplied to said device has a moisture content of, for example, 5-20%. The supplied biomass may be untreated biomass or biomass which has been pre-dried in a pre-drier (not shown) in order to lower the moisture content in the biomass to 5-20% before supplying it to the device 3.

In this exemplary embodiment, the first treatment device 3 is configured as a so-called torbed reactor. The torbed reactor 3 comprises an annular treatment chamber with a substantially vertical axis. The supply 4 for supplying biomass debouches into the treatment chamber. The treatment chamber has an annular bottom which is provided with supply openings which debouch obliquely upwards and in the peripheral direction of the annular bottom (not shown), preferably configured as blades which are arranged in a circle around a centre of the reactor, which are arranged obliquely and which, between them, form supply openings through which hot gas flows obliquely upwards from a gas supply chamber below these blades and comes into contact with a bed of biomass particles which has been fluidized by the gas.

The supply openings are connected to an inlet 6 for a hot gas, preferably via a gas supply chamber arranged underneath the treatment chamber from which the gas flows upwards through the bottom of the treatment chamber into a bed of biomass particles, preferably as in a torbed reactor. Above the preferably annular bottom, a fluidized bed of biomass particles is produced as a result of hot gas flowing from the supply openings, which fluidized bed rotates, with the torbed reactor, in the peripheral direction of the annular treatment chamber. Due to the supplied hot gas and the biomass particles being in direct contact, heat is transferred in the treatment chamber. After the heat exchange with the biomass particles, the hot gas leaves the first treatment device 3 via an outlet 7 for hot gas. The hot gas in the first treatment device may be a waste gas with a relatively high oxygen content.

The torrefaction of the biomass particles in the first treatment device only starts after the temperature of the biomass particles has risen above 180° C. Depending on the type of biomass, the torrefaction of the biomass particles may also only start after the biomass particles reach a temperature of at least 200° C. As, in this example, the biomass supplied to the first treatment device 3 contains 5-20% moisture, the moisture has to evaporate from the biomass first until the biomass is virtually free from moisture (drying phase). Therefore, the biomass is first dried substantially completely in the first treatment device 3 and then heated to the desired torrefaction temperature. In this exemplary embodiment, the biomass is heated in the first treatment device to a torrefaction temperature of approximately 280° C. (see FIG. 2).

With a fixed bed reactor according to the prior art, it takes approximately 20 minutes to complete the drying phase and to bring the biomass to the torrefaction temperature of approximately 280° C. (see line 31 in FIG. 2). By using the first treatment device 3 with the fluidized bed of biomass particles, preferably with a torbed reactor, there is a significant amount of heat transfer between the hot gas and the biomass particles, so that the biomass particles dry particularly quickly and are heated to the torrefaction temperature. For example, less than 2 minutes are sufficient for this purpose (see line 33 in FIG. 2).

In the first treatment device 3, the biomass particles are therefore heated to the desired torrefaction temperature in said range, in this exemplary embodiment 280° C., in a relatively short first time period. In other words, during the relatively short first time period in the first treatment device, the biomass particles are dried substantially completely, that is to say the moisture content falls to 0-5%, and at least a part of the biomass particles reaches the desired torrefaction temperature.

The biomass particles will only remain in the first treatment device 3 for a limited time, such as at most approximately 3 minutes. The short residence time is connected to the volume content of the treatment chamber of the first treatment device 3 and the desired capacity of the system. The dried and at least partially torrefied biomass particles are then discharged from the first treatment device 3 via the discharge 5.

Figure 2:
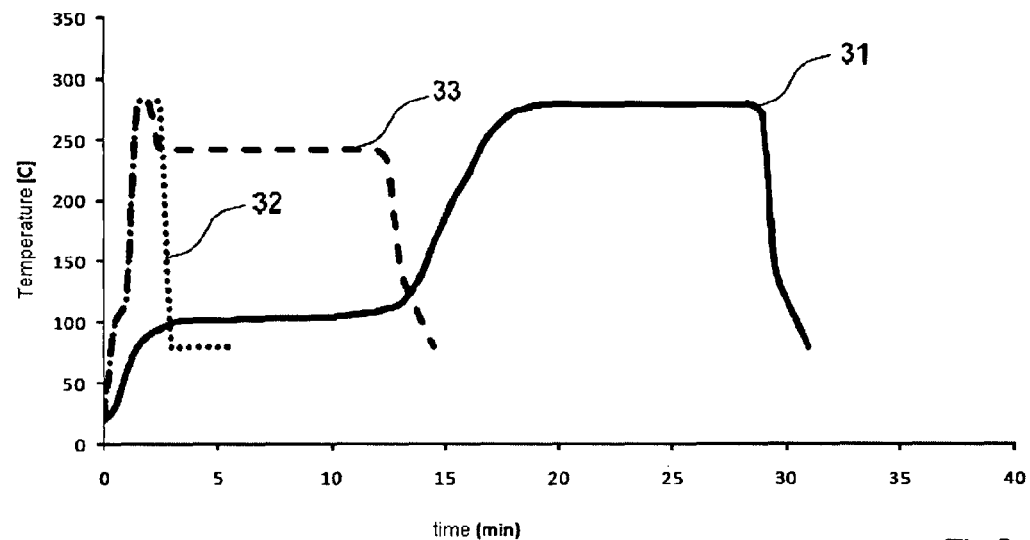
FIG. 2 shows a graph in which the temperature of the biomass is given as a function of time during the implementation of two known torrefaction processes and the torrefaction process according to the invention.

Line 32 in FIG. 2 shows the temperature profile in case the biomass particles were to be cooled down immediately following discharge from the first treatment device 3. By spreading of the residence time in the first treatment device 3, a part of the biomass particles would then not reach the desired torrefaction temperature or only for a very short time. The relatively large biomass particles in particular require more time to "heat through" and to torrefy completely. For this reason, several torbed reactors are connected in series in the prior art in order to keep the biomass particles at the torrefaction temperature, but this is relatively expensive.

The biomass particles substantially consist of the polymers cellulose, hemicellulose and lignin. During heating of the biomass particles to a temperature in the torrefaction temperature regime (above 180° C.), cellulose, hemicellulose and lignin undergo decomposition reactions, which are shown in FIG. 3.

Figure 3:
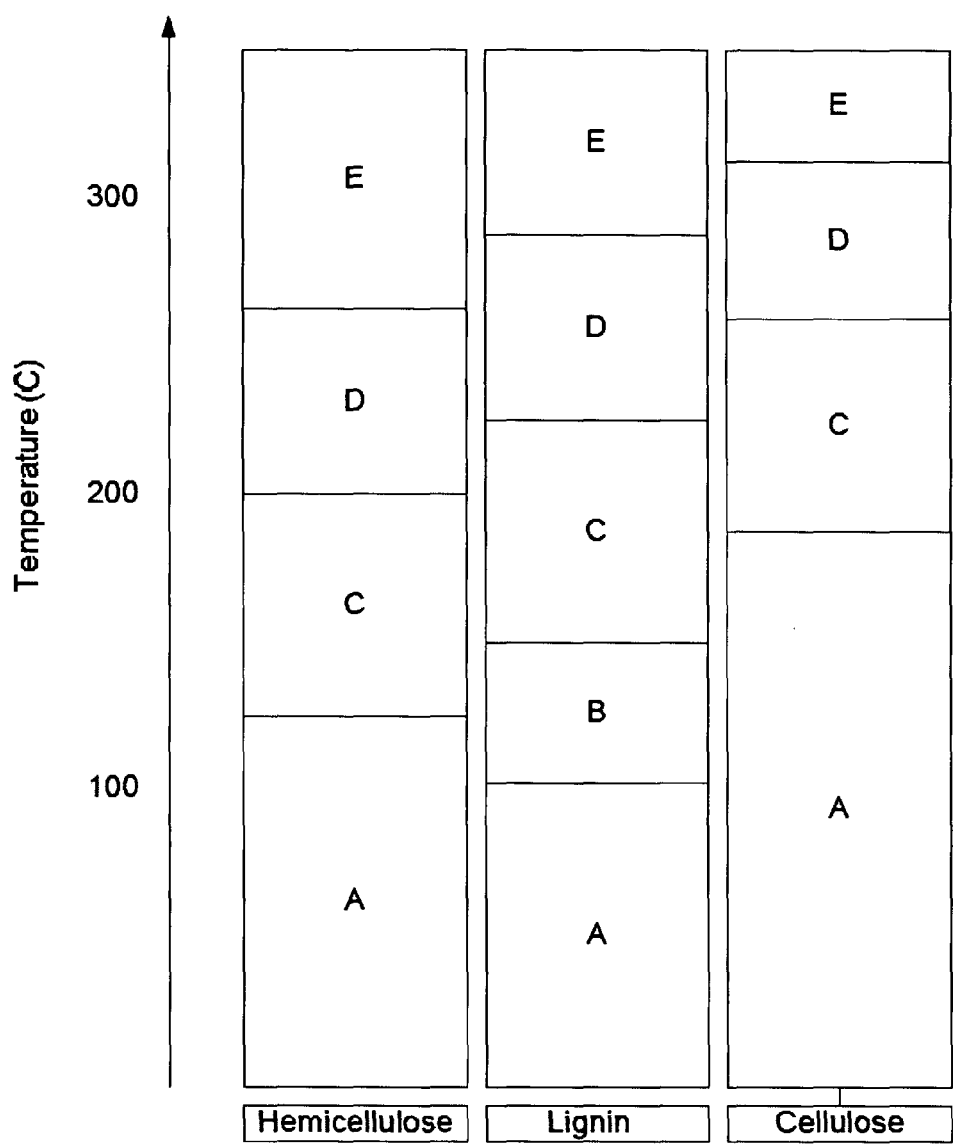
FIG. 3 shows a diagram in which the various decomposition reactions for hemicellulose, lignin and cellulose are given as a function of the temperature.

FIG. 3 shows that cellulose, hemicellulose and lignin undergo different decomposition reactions, which are denoted by A, B, C, D and E. The temperature ranges from FIG. 3 relate to wood-based biomass—for other kinds of biomass, the transitions between the various decomposition reactions may take place at other temperatures. The decomposition mechanisms of cellulose, hemicellulose and lignin as a function of temperature can be categorized as follows: drying (A), glass transition and/or softening (B), depolymerization and recondensation (C), limited degassing and carbonization (D), and intense degassing and carbonization (E). In addition, cellulose, hemicellulose and lignin have a different degree of reactivity in the torrefaction temperature regime.

In the abovementioned decomposition mechanisms A, B and C, relatively little loss of mass occurs—at most a desired degassing in which $CO_2$ and $H_2O$ are formed. $CO_2$ and $H_2O$ have no calorific value, so that this degassing does result in a loss of mass but not or hardly at all in a loss of energy. In the abovementioned decomposition mechanism D, the loss of mass increases and in E, the decomposition reaction proceeds relatively quickly. During the decomposition mechanisms D and E, a relatively large amount of energy is passed to the gas phase and the energy value of the biomass decreases.

Figure 4:
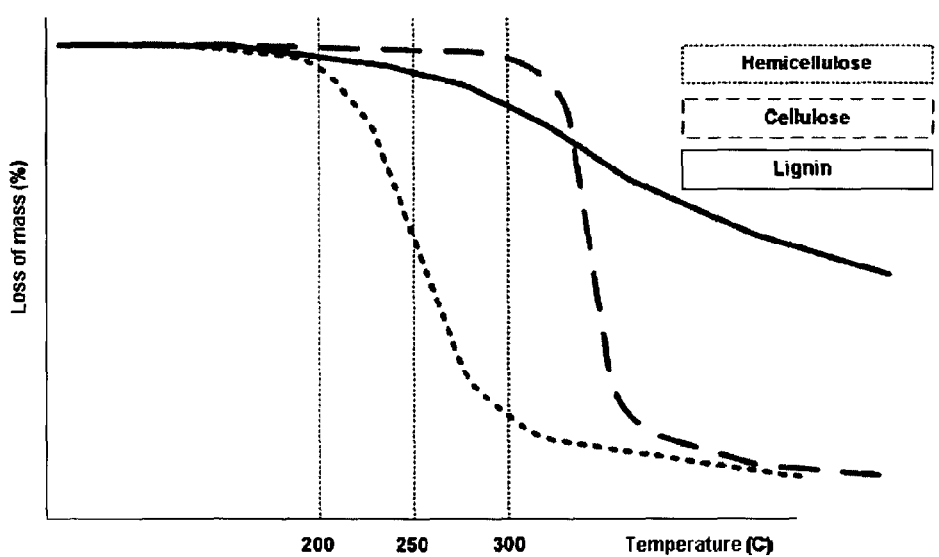
FIG. 4 shows a graph in which the loss of mass of hemicellulose, cellulose and lignin is given as a function of the temperature.

However, the reactivity of cellulose, lignin and hemicellulose differs greatly. Hemicellulose is the most thermally unstable and undergoes degassing and carbonization between approximately 200-280° C. Cellulose is relatively stable by comparison and undergoes degassing and carbonization at a temperature which is higher than approximately 250° C. The decomposition of both polymers is characterized by a distinct peak in decomposition rate. As is illustrated in FIG. 4, the decomposition of lignin starts at approximately 200° C. and subsequently proceeds relatively slowly. When the temperature is increased, the decomposition rate increases at a moderate rate. Relatively intense degassing only takes place above approximately 300° C., although the reaction rate is in this case smaller than the reaction rate which is observed for the two other polymers.

In order to produce a biomass fuel with optimum properties, it is desirable that, after the torrefaction process, the decrease in mass becomes as large as possible and the loss of energy is limited as much as possible, while the further desired properties, such as improved pulverizability are also achieved. The improved properties are mainly brought about by the substantial decomposition of hemicellulose and depolymerization of cellulose. This causes the biomass to lose its integrity, which results in, for example, improved pulverizability and higher net heating value of the torrefied product.

As a result of the high heating rates in the first treatment device 3, in particular if this comprises a fluidized bed reactor, it is possible to achieve a mass yield of 80 to 90% in this first treatment device at a torrefaction temperature of 280° C. and a torrefaction time of less than 300 seconds, preferably less than 180 seconds. Since the reactivity of hemicellulose is significantly higher than the reactivity of cellulose and lignin, hardly any decomposition of cellulose and lignin will occur at such a short reaction time.

After the biomass particles have been discharged from the first treatment device 3, the biomass particles are, in this example, supplied to a supply 11 of a cooling device 10 (see FIG. 1). Here, the particles are cooled, in which case the temperature of the biomass particles in the cooling device 10 remains above the torrefaction temperature of 180° C. In the cooling device 10, the temperature of the biomass particles is thus lowered with respect to the temperature of the biomass particles in the first treatment device 3, but remains above 180° C., for example above 230° C. The biomass particles are cooled down in the cooling device 10 to, for example, a temperature of approximately 240° C. (see line 33 in FIG. 3).

In order to cool the biomass particles in the cooling device, a cooling agent is supplied via an inlet 14. The cooling agent is, for example, a coolant gas. The cooling agent extracts heat from the biomass particles as a result of direct contact between the cooling agent and the biomass particles, thus raising the temperature of the cooling agent. The heated cooling agent subsequently leaves the cooling device 10 via an outlet 15. The slightly cooled biomass particles are discharged from the cooling device 10 via a discharge 12. The discharge 12 of the cooling device 10 is connected to a supply 19 of a second treatment device 18.

In this example, the second treatment device 18 is configured according to the principle of a plug flow reactor. In this exemplary embodiment, the second treatment device 18 is formed by a moving bed reactor. In the second treatment device, the biomass particles are kept at a torrefaction temperature in said temperature range, which is between 230-280° C., for a second time period. If desired, this temperature is lower than the torrefaction temperature of the biomass particles in the first treatment device. In this exemplary embodiment, the temperature of the biomass particles in the second treatment device is approximately 240° C. (see line 33 in FIG. 2).

In order to keep the biomass particles at the desired torrefaction temperature in the second treatment device, the second treatment device 18 in this exemplary embodiment has two inlets 21, 22. The first inlet 21 of the second treatment device is connected to the outlet 15 of the cooling device 10. The warmed-up coolant gas from the cooling device 10 is passed to the second treatment device 18 via a pipe. In addition, a hot gas is supplied to the second treatment device 18 via the second inlet 22. These gases leave the second treatment device 18 via the outlet 23.

In the second treatment device 18, all biomass particles are "heated through" during the second time period, thus ensuring that all biomass particles are sufficiently torrefied. The biomass particles are then discharged from the second treatment device 18 via the discharge 20.

In this exemplary embodiment, the discharge 20 of the second treatment device 18 is connected to an after-treatment system. The after-treatment system comprises, for example, a second cooling device 24 for cooling the torrefied biomass to a temperature of approximately 80° C. or lower, and downstream thereof in the process a device for pulverizing and compressing the biomass particles to form biomass fuel particles.

By cooling the biomass particles during the transition between the first and second treatment device, for example to a temperature of 240° C., the decomposition of hemicellulose in the first treatment device 3 is as it were separated from the decomposition of the two other polymers in the cooling device 10 and/or in particular the second treatment device 18.

While the biomass particles are being heated to the torrefaction temperature of approximately 280° C. in the first treatment device 3 in a relatively short time, for example in at most 3 minutes, decomposition of hemicellulose occurs, but the decomposition of cellulose and lignin is largely prevented. By lowering the temperature of the biomass particles in the cooling device 10 to 240° C. and then keeping them at said temperature in the second treatment device 18, the further decomposition of cellulose and lignin is limited substantially to depolymerization and recondensation.

During depolymerization and recondensation in the second treatment device 18, relatively large amounts of $CO_2$ and $H_2O$ are formed, resulting in loss of mass, while preserving the energy in the biomass particles. In addition, this results in an increased concentration of lignin which has surprisingly remained largely intact. Thus, the plastic and binding properties can be used to an optimum degree during compaction of the biomass.

Figure 5:
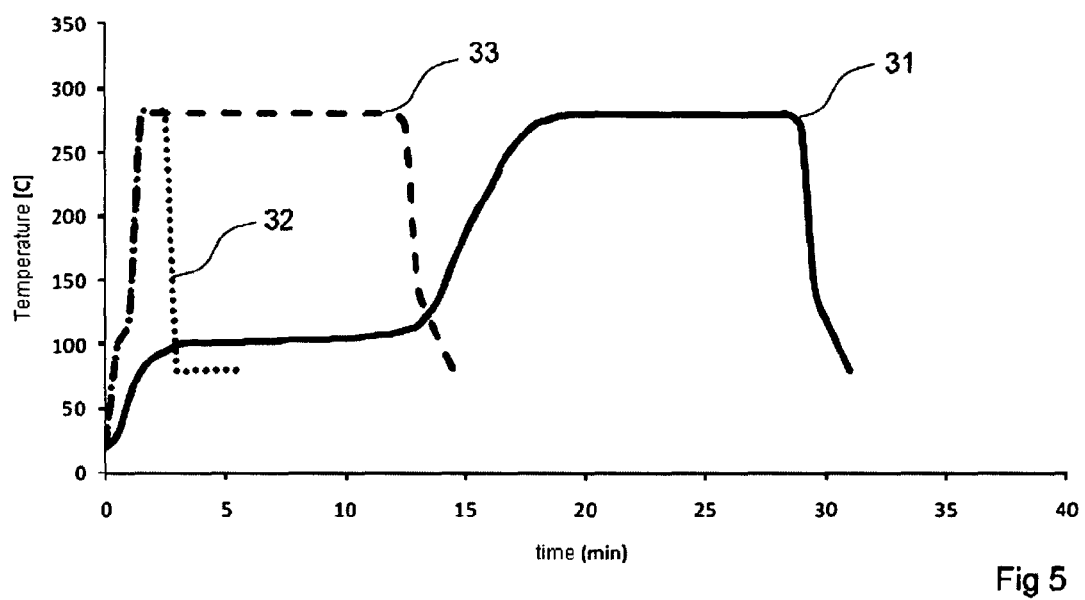
FIG. 5 shows a graph in which the temperature of the biomass is given as a function of time during implementation of two known torrefaction processes and a second embodiment of a torrefaction process according to the invention.

In a second embodiment of the method according to the invention, the step of cooling the biomass to a lower torrefaction temperature after discharging the biomass from the first treatment device 3 is not carried out. In this case, the discharge 5 of the first treatment device 3 is directly connected to the supply 19 of the second treatment device 18 (not shown). The temperature profile as a function of time for this embodiment is illustrated in FIG. 5.

The invention is not limited to the exemplary embodiment illustrated in the figures. The person skilled in the art can make various modifications which are within the scope of the invention. According to the invention, it is, for example, possible for the first treatment device not to be configured as a torbed reactor, but as a directly heated Continuous Ideally Stirred-Tank Reactor (CISTR) or different yet again. In addition, one or more of the above-described features may be applied separately or in combination with one or more of the following claims.

The invention also relates to the following clauses:
1. Method for treating biomass, comprising:
   supplying biomass which contains an amount of moisture to a torrefaction system (1),
   heating the biomass containing moisture to a torrefaction temperature of at least 180° C. in the torrefaction system (1), in which the biomass containing moisture is substantially completely dried by evaporating the moisture and the dried biomass is at least partially torrefied to form torrefied biomass,
   characterized in that the torrefaction system (1) comprises a first treatment device (3) and a second treatment device (18), in which heating the biomass to the torrefaction temperature is carried out in the first treatment device (3) within a first time period, and the at least partially torrefied biomass is removed from the first treatment device (3) after the first time period, and in which the biomass which has been removed from the first treatment device (3) is transferred to the second treatment device (18) and is subsequently kept at a temperature of at least 180° C. in the second treatment device (18) for a second time period which is longer than the first time period.
2. Method according to clause 1, in which the first time period is at most 10 minutes, preferably at most 3 minutes.
3. Method according to clause 1 or 2, in which the second time period is at least 3 minutes, preferably at least 5 minutes, such as at least 10 minutes or at least 20 minutes.
4. Method according to one of the preceding clauses, in which the biomass containing moisture is heated in the first treatment device (3) to a temperature which is higher than 230° C., preferably higher than 260° C., and in which the biomass in the second treatment device (18) is kept at a temperature which is lower than the highest temperature which the biomass reaches in the first treatment device (3).
5. Method according to clause 4, in which the biomass containing moisture is heated in the first treatment device (3) to a temperature between 260-290° C., and in which the biomass is kept at a temperature between 230-260° C. in the second treatment device (18).
6. Method according to one of the preceding clauses, in which the biomass is heated to the torrefaction temperature in the first treatment device (3) by supplying a hot gas to the first treatment device (3) which is brought into direct contact with the biomass.
7. Method according to clause 6, in which the hot gas is supplied to the first treatment device (3) for fluidizing biomass particles of the biomass in the first treatment device (3).
8. Method according to one of the preceding clauses, in which the first treatment device (3) is of the Continuous Ideally Stirred-Tank Reactor (CISTR) type.
9. Method according to one of the preceding clauses, in which the first treatment device (3) is provided with an annular treatment chamber which defines a substantially vertical axis, which treatment chamber comprises a supply (4) for biomass particles, a discharge (5) for biomass particles and a bottom, which bottom is provided with supply openings which debouch obliquely with respect to the vertical axis upwards into the treatment chamber, in which a hot gas is supplied to the supply openings for forming a fluidized bed of biomass particles on the bottom which is displaced in the peripheral direction of the annular treatment chamber.
10. Method according to one of clauses 6-9, in which the hot gas which is supplied to the first treatment device (3) contains at least 2% oxygen on a volume basis, preferably at least 3% oxygen on a volume basis or at least 4% oxygen on a volume basis.
11. Method according to one of the preceding clauses, in which the biomass in the second treatment device (18) is kept at a temperature of at least 180° C. during the second time period by supplying a hot gas to the second treatment device (18) which is brought into direct contact with the biomass in the second treatment device (18).
12. Method according to clause 11, in which the hot gas which is supplied to the second treatment device (18) contains at most 3% oxygen on a volume basis, preferably at most 2% oxygen on a volume basis.
13. Method according to one of the preceding clauses, in which the biomass in the second treatment device (18) is kept at a temperature of at least 180° C. during the second time period by a heating agent which is separated from the biomass in the second treatment device (18) by means of a partition wall and is in heat-exchanging contact with the biomass in the second treatment device (18) via the partition wall.
14. Method according to one of the preceding clauses, in which the second treatment device (18) is of the plug flow reactor type.
15. Method according to one of the preceding clauses, in which the first treatment device (3) comprises a drying device and a torrefaction device, and in which the biomass containing moisture is dried substantially completely in the drying device, and in which the dried biomass is transferred from the drying device to the torrefaction device, and in which the dried biomass is at least partially torrefied in the torrefaction device.
16. Method according to clause 15, in which the biomass is heated in the drying device to a temperature between 80-180° C., and in which the dried biomass is heated in the torrefaction device to the torrefaction temperature of at least 180° C.
17. Method according to one of the preceding clauses, in which the method comprises supplying biomass which contains a first amount of moisture to a drier, and heating the biomass containing the first amount of moisture in the drier in order to evaporate moisture from said biomass until it contains a second amount of moisture which is smaller than the first amount of moisture, and in which the biomass containing the second amount of moisture is supplied to the torrefaction system.
18. Device for treating biomass, comprising:
    a torrefaction system (1) which is provided with a supply (4) for supplying biomass which contains an amount of moisture, heating means for heating the biomass containing moisture to a torrefaction temperature of at least 180° C. in the torrefaction system (1) for substantially completely drying the biomass containing moisture by evaporation of the moisture and at least partially torrefying the dried biomass to form torrefied biomass, and a discharge for discharging torrefied biomass,
    characterized in that the torrefaction system (1) comprises a first treatment device (3) and a second treatment device (18), in which the first treatment device (3) is configured to heat the biomass therein to the torrefaction temperature within a first time period, and the first treatment device (3) and the second treatment device (18) are connected to one another in order to transfer the biomass from the first treatment device (3) to the second treatment device (18), and in which the second treatment device (18) is configured to keep the biomass therein at a temperature of at least 180° C. for a second time period which is longer than the first time period.

The invention claimed is:

1. Method for treating biomass with a torrefaction system, which torrefaction system comprises a first treatment device and a second treatment device, and in which the method comprises:
   supplying biomass which contains an amount of moisture to the first treatment device of the torrefaction system,
   heating the biomass containing moisture in the first treatment device of the torrefaction system to a torrefaction temperature between 260-310° C. within a first time period, in which the biomass containing moisture is substantially completely dried by evaporating the moisture and the dried biomass is at least partially torrefied to form torrefied biomass,
   removing the at least partially torrefied biomass from the first treatment device after the first time period,
   supplying the biomass removed from the first treatment device to the second treatment device,
   keeping the biomass supplied to the second treatment device in the second treatment device at a temperature between 230-280° C. for a second time period which is longer than the first time period.

2. Method according to claim 1, in which the first time period is at most 10 minutes.

3. Method according to claim 2, in which the second time period is at least 10 minutes.

4. Method according to claim 1 in which the second time period is at least 3 minutes.

5. Method according to claim 1, in which the biomass in the second treatment device is kept at a temperature which is lower than the highest temperature which the biomass reaches in the first treatment device.

6. Method according to claim 5, in which the biomass is cooled during passage from the first treatment device to the second treatment device to a temperature between 230-250° C.

7. Method according to claim 6, in which this cooling is carried out by bringing the biomass into direct contact with a coolant gas.

8. Method according to claim 1, in which the biomass containing moisture is heated to a temperature between 260-290° C. in the first treatment device, and in which the biomass is kept at a temperature between 230-260° C. in the second treatment device.

9. Method according to claim 1, in which the biomass is heated to the torrefaction temperature in the first treatment device by supplying a hot gas to the first treatment device which is brought into direct contact with the biomass.

10. Method according to claim 9, in which the hot gas is supplied to the first treatment device for fluidizing biomass particles of the biomass in the first treatment device.

11. Method according to claim 1, in which the first treatment device is of the Continuous Ideally Stirred-Tank Reactor (CISTR) type.

12. Method according to claim 1, in which the first treatment device is provided with an annular treatment chamber which defines a substantially vertical axis, which treatment chamber comprises a supply for biomass particles, a discharge for biomass particles and a bottom, which bottom is provided with supply openings which debouch obliquely with respect to the vertical axis upwards into the treatment chamber, in which a hot gas is supplied to the supply openings for forming a fluidized bed of biomass particles on the bottom which is displaced in the peripheral direction of the annular treatment chamber.

13. Method according to claim 1, in which hot gas is supplied to the first treatment device, which hot gas contains at least 2% oxygen on a volume basis.

14. Method according to claim 13, in which the hot gas which is supplied to the first treatment device contains at most 20% oxygen on a volume basis.

15. Method according to claim 1, in which the biomass in the second treatment device is kept in said temperature range during the second time period by supplying a hot gas to the second treatment device which is brought into direct contact with the biomass in the second treatment device.

16. Method according to claim 15, in which the hot gas which is supplied to the second treatment device contains at most 3% oxygen on a volume basis.

17. Method according to claim 1, in which the biomass in the second treatment device is kept in said temperature range during the second time period by a heating agent which is separated from the biomass in the second treatment device by means of a partition wall and which is in heat-exchanging contact with the biomass in the second treatment device via the partition wall.

18. Method according to claim 1, in which the second treatment device is of the plug flow reactor type.

19. Method according to claim 1, in which the first treatment device comprises a drying device and a torrefaction device, and in which the biomass containing moisture is dried substantially completely in the drying device, and in which the dried biomass is transferred from the drying device to the torrefaction device, and in which the dried biomass is at least partially torrefied in the torrefaction device.

20. Method according to claim 19, in which the biomass is heated in the drying device to a temperature between 80-180° C., and in which the dried biomass is heated in the torrefaction device of the first treatment device to the torrefaction temperature.

21. Method according to claim 1, in which the method comprises supplying biomass which contains a first amount of moisture to a pre-drier, and heating the biomass containing the first amount of moisture in the pre-drier in order to evaporate moisture from said biomass until it contains a second amount of moisture which is smaller than the first amount of moisture, and in which the biomass containing the second amount of moisture is supplied to the first treatment device of the torrefaction system.

22. Torrefaction system for treating biomass, comprising:
   a first treatment device, comprising a first supply for supplying biomass which contains an amount of moisture to the first treatment device, first heating means for heating the biomass containing moisture to a torrefaction temperature between 260-310° C. within a first time period for substantially completely drying the biomass containing moisture by evaporation of the moisture and at least partially torrefying the dried biomass to form torrefied biomass in the first treatment device, and a first discharge for discharging torrefied biomass from the first treatment device, and
   a second treatment device, comprising a second supply which is connected to the first discharge of the first treatment device for transferring the biomass from the first treatment device to the second treatment device, in which the second treatment device is configured to keep the biomass therein at a temperature between 230-280° C. for a second time period which is longer than the first time period, and in which the second treatment device is provided with a second discharge for discharging the biomass torrefied in the second treatment device.

* * * * *